(12) United States Patent
Lindgren et al.

(10) Patent No.: US 11,814,110 B2
(45) Date of Patent: Nov. 14, 2023

(54) SYSTEM FOR INSULATING A STRUCTURAL ELEMENT

(71) Applicant: SIKA TECHNOLOGY AG, Baar (CH)

(72) Inventors: Henrik Lindgren, Feluy (BE); Gino Saint Medar, Uccle (BE); Didier Henrion, Vilvoorde (BE)

(73) Assignee: SIKA TECHNOLOGY AG, Baar (CH)

( * ) Notice: Subject to any disclaimer, the term of this patent is extended or adjusted under 35 U.S.C. 154(b) by 361 days.

(21) Appl. No.: 17/263,226

(22) PCT Filed: Aug. 27, 2019

(86) PCT No.: PCT/EP2019/072886
§ 371 (c)(1),
(2) Date: Jan. 26, 2021

(87) PCT Pub. No.: WO2020/043740
PCT Pub. Date: Mar. 5, 2020

(65) Prior Publication Data
US 2021/0163078 A1  Jun. 3, 2021

(30) Foreign Application Priority Data
Aug. 31, 2018 (EP) .................... 18192068

(51) Int. Cl.
*B62D 29/00* (2006.01)
*B62D 25/00* (2006.01)
(Continued)

(52) U.S. Cl.
CPC .......... *B62D 29/002* (2013.01); *B29C 44/188* (2013.01); *B29C 44/1214* (2013.01);
(Continued)

(58) Field of Classification Search
CPC .... B62D 29/002; B62D 29/005; B62D 25/00; B29C 44/1214; B29C 44/18;
(Continued)

(56) References Cited

U.S. PATENT DOCUMENTS 6,058,673 A * 5/2000 Wycech .................. B29C 44/18
296/187.02
2004/0239148 A1 12/2004 Ratet
(Continued)

FOREIGN PATENT DOCUMENTS

CN 207078094 U * 3/2018
DE 102011000450 A1 * 8/2012 ............. B62D 25/00
(Continued)

OTHER PUBLICATIONS

Takahata, "Mounting Structure of Foaming Material for Hollow Structure", Published: May 2001, Publisher: Japanese Patent Office, Edition: JP2001146176A (Year: 2001).*
(Continued)

*Primary Examiner* — Dennis H Pedder
*Assistant Examiner* — Joyce Eileen Hill
(74) *Attorney, Agent, or Firm* — Oliff PLC (57) ABSTRACT

A system for insulating a structural element in a motor vehicle including a structural element having a first constituent part and a second constituent part which are joined together at a first joining point and a second joining point and form a cavity. The system furthermore includes a device having a carrier and a first expandable adhesive, wherein the carrier is arranged on the first constituent part of the structural element by way of a fastening element. The system furthermore includes a second expandable adhesive which is arranged on the second constituent part of the structural element. In this case, the first expandable adhesive and the second expandable adhesive are configured, and arranged, in (Continued)

such a way that, after the adhesives have been expanded, the device and the second expandable adhesive substantially completely fill a cross section of the structural element.

15 Claims, 4 Drawing Sheets

(51) Int. Cl.
  *B29C 44/18*  (2006.01)
  *B29C 44/12*  (2006.01)
  *B60R 13/08*  (2006.01)
  *B29L 31/30*  (2006.01)

(52) U.S. Cl.
  CPC ....... *B29C 44/18* (2013.01); *B29L 2031/3002* (2013.01); *B60R 13/08* (2013.01); *B60R 13/0815* (2013.01); *B62D 25/00* (2013.01); *B62D 29/005* (2013.01)

(58) Field of Classification Search
  CPC ........... B29C 44/188; B29L 2031/3002; B60R 13/08; B60R 13/0815; B60R 2013/0807; Y10T 428/24008; Y10T 428/24017
  USPC .................... 296/187.02, 187.06, 193.06
  See application file for complete search history.

(56) References Cited

U.S. PATENT DOCUMENTS

| | | |
|---|---|---|
| 2009/0223739 A1 | 9/2009 | Duffin et al. |
| 2015/0266518 A1* | 9/2015 | Donabedian ......... B62D 27/026 296/210 |
| 2015/0315782 A1 | 11/2015 | Belpaire et al. |
| 2018/0015957 A1* | 1/2018 | Kishima .............. B62D 29/043 |
| 2019/0126855 A1 | 5/2019 | Ulmann |

FOREIGN PATENT DOCUMENTS

| | | | | |
|---|---|---|---|---|
| EP | 1273480 A1 | 1/2003 | | |
| EP | 3281970 A1 | 2/2018 | | |
| GB | 2463858 A | 3/2010 | | |
| JP | 09085767 A | * | 3/1997 | ........... B29C 44/188 |
| JP | 2001146176 A | * | 5/2001 | ............. B62D 25/04 |
| WO | WO-2008065049 A1 | * | 6/2008 | ............ B29C 44/18 |
| WO | 2014/095620 A1 | 6/2014 | | |
| WO | 2017/182606 A1 | 10/2017 | | |

OTHER PUBLICATIONS

Kellner et al., "Support structure has expandable adhesive material between structural element and reinforcement element", Published: Aug. 2, 2018, Publisher: German Patent Office, Edition: DE102011000450A1 (Year: 2018).*

Kobayashi "Expandable Base Material for Interception of Hollow Chamber of Hollow Structure", Published: Mar. 31, 1997, Publisher: Japanese Patent Office, Edition: JP-09085767-A (Year: 1997).*

Mizuno, "A sealing member of automobile waterproof foam profile", Published: Sep. 3, 2018, Publisher: European Patent Office, Edition: CN207078094U (Year: 2018).*

Nov. 8, 2019 International Search Report issued in International Patent Application No. PCT/EP2019/072886.

Mar. 2, 2021 International Preliminary Report on Patentability issued in International Patent Application No. PCT/EP2019/072886.

* cited by examiner

SYSTEM FOR INSULATING A STRUCTURAL ELEMENT

The invention relates to a system for insulating a structural element in a motor vehicle. It also relates to a method for insulating a structural element in a motor vehicle.

In many cases, components, such as for example bodies and/or frames of transportation and conveyance means, in particular of aquatic or terrestrial vehicles or of aircraft, have structures with cavities in order to make lightweight constructions possible. However, these cavities cause a wide variety of problems. Depending on the nature of the cavity, it has to be sealed in order to prevent the ingress of moisture and dirt, which can lead to corrosion of the components. It is often also desirable to substantially reinforce the cavities, and thus the component, but to retain the low weight. It is often also necessary for the cavities, and thus the components, to be stabilized in order for noises which would otherwise be transmitted along or through the cavity to be reduced. Many of these cavities have an irregular shape or a narrow extent, making it more difficult to seal, reinforce and insulate them properly.

In particular in automotive construction, but also in aircraft construction and boat building, sealing elements (baffles) are therefore used in order to seal and/or acoustically isolate cavities, or reinforcing elements (reinforcers) are used in order to reinforce cavities.

Figure 1:
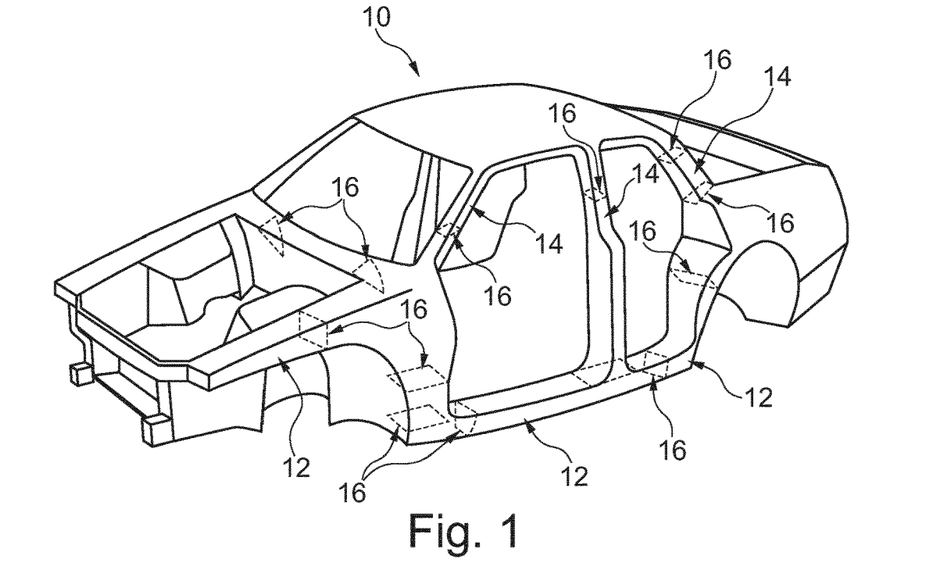
FIG. 1 shows an exemplary illustration of a vehicle body according to the prior art.

FIG. 1 schematically illustrates a body of an automobile. Here, the vehicle body 10 has various structures with cavities, such as for example pillars 14 and carriers or braces 12. Such structural elements 12, 14 with cavities are usually sealed and/or reinforced, respectively, using sealing and/or reinforcing elements 16.

Figure 2A:
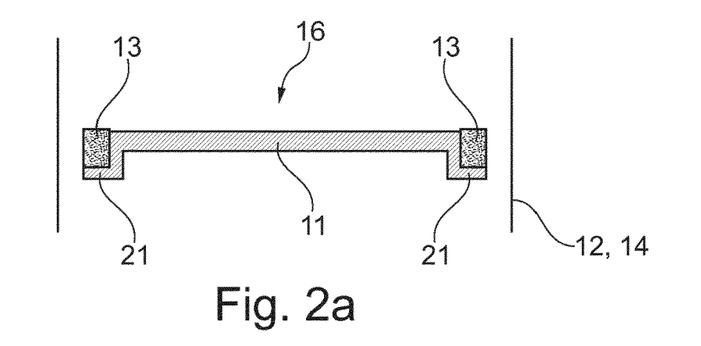
FIGS. 2a and 2b show schematic illustrations of an exemplary device according to the prior art.
Figure 2B:
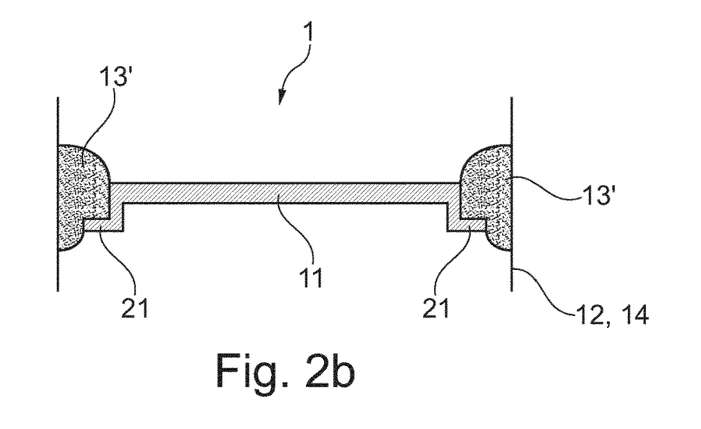

FIGS. 2a and 2b schematically show a known concept for the sealing and/or reinforcing closure of openings or cavities in a motor vehicle.

Here, FIG. 2a shows a device 16 prior to an expansion of an adhesive 13. FIG. 2b shows the same device 16 as a constituent part of the system 1 but after the adhesive 13 has been expanded, that is to say with the expanded adhesive 13'.

The device 16 is located in a cavity of a vehicle body structure, as is illustrated for example in FIG. 1. A portion of such a structural element 12, 14 of a vehicle body is schematically illustrated in FIGS. 2a and 2b. The device 16 comprises a carrier 11, which has an edge region 21. The adhesive 13 is in this case arranged substantially on said edge region 21 of the carrier 11.

A gap exists between the device 16 and the structural element 12, 14 prior to the expansion of the adhesive 13. Said gap permits the structural element 12, 14 to be coated in order to achieve an anti-corrosion protection of the structural element 12, 14. After said coating, the adhesive 13 is usually expanded by way of a thermal influence, wherein the expanded adhesive 13' closes the gap between the device 16 and the structural element 12, 14 as a result. Fixing of the device 16' in the structural element 12, 14 is moreover also simultaneously achieved as a result of the expansion of the adhesive 13. A device 16' that is fastened in the structural element 12, 14 in such a manner reinforces the structural element 12, 14, on the one hand, and closes the cavity in the structural element 12, 14, on the other hand.

It is a disadvantage of the previously known sealing and/or reinforcing elements that, in the majority of cases, an individually adapted element has to be produced for each vehicle body shape and for each cavity of a vehicle body. This leads to high development and production costs, and is disadvantageous in particular in the case of relatively small vehicle series.

Furthermore, the known sealing and/or reinforcing elements have the disadvantage that they can often only insufficiently seal or reinforce regions which are difficult to access in complex cavities.

It is therefore an object of the present invention to provide an improved system for insulating a structural element in a motor vehicle, which avoids the disadvantages of the prior art. The system is intended to give rise in particular to economic advantages in the case of relatively small unit quantities and to reduce development and production complexity overall. Furthermore, the intention is to ensure better filling of difficult-to-access portions of cavities.

Said object is achieved by a system for insulating a structural element in a motor vehicle, the system comprising: a structural element having a first constituent part and a second constituent part, wherein the constituent parts are joined together at a first joining point and at a second joining point, and wherein the structural element forms a cavity; a device having a carrier and a first expandable adhesive, wherein the carrier is arranged on the first constituent part of the structural element by way of a fastening element; and a second expandable adhesive which is arranged on the second constituent part of the structural element; wherein the first expandable adhesive and the second expandable adhesive are in a non-expanded state and are configured, and arranged, in such a way that, after an expansion, the device and the second expandable adhesive substantially completely fill a cross section of the structural element.

Said solution firstly has the advantage that various structural elements can be insulated by such a system with a single standardized device. In this case, the device with the first expandable adhesive in particular fills a large part of the cavity in the structural element. The second expandable adhesive is used in particular in regions of the cavity which are difficult to access, and thus difficult to fill, with the device. Since the second expandable adhesive is applied individually and directly onto the structural element, an amount and a shape of the second expandable adhesive can be adapted individually to the respective structural element. It is thus the case that no individual devices need be produced for different structural elements or for different cavities of the structural element, it rather being the case that a large spectrum of different structural elements can be covered with one standardized device or with a few standardized devices in conjunction with the second expandable adhesive.

A core concept of the present invention consists, firstly, in providing a device which can be used to insulate a standardized cavity of structural elements. A second expandable adhesive, which can be used, as needed, for a specific (possibly irregularly formed) cavity of a structural element, is then added to said device. The device can thus be produced in high unit quantities, and the second expandable adhesive can be introduced into the structural element using favorable production and application methods (in particular by pumping or extrusion). As a result, lower overall costs can be achieved than if an individually manufactured device were to have to be produced for each cavity. In addition, the variable use of the second expandable adhesive makes it possible to achieve better filling of difficult-to-access regions of the cavities.

In the context of this invention, the designation "insulation" or "insulated" comprises elements or functions or structures or method steps for isolating and/or closing and/or reinforcing and/or damping and/or insulating a structural element. These various properties of such an insulation can in this case arise individually or else in combination with one another.

The structural element comprises at least a first constituent part and a second constituent part which are joined together at a first joining point and at a second joining point and thus form a cavity. In this case, the first and the second constituent part of the structural element can be composed in each case of one element or else of a plurality of elements. The structural element can therefore also have more than two joining points.

In one exemplary embodiment, the system comprises a plurality of devices having a carrier and a first expandable adhesive. By way of example, the system comprises two devices, three devices, four devices, five devices, more than two devices, more than three devices, more than four devices, or more than five devices.

In this case, both the shape and the materials of said plurality of devices can in each case be the same or different.

By way of example, the carrier of a first device and the carrier of a second device can thus have the same or a different shape, and the first expandable material of the first device and the first expandable material of the second device can for example have the same or different expansion rates or compositions or moduli of elasticity in an activated state.

In one exemplary embodiment, the device has a compact form.

In one exemplary embodiment, the device has substantially the form of a cuboid or cylinder or truncated cone or cone or cone of revolution.

The formation of a compact device has the advantage that, as a result, the device is robust in use and can be stacked efficiently. Such a form of the device is also advantageous for the uniform filling of a main region of the cavity of the structural element.

In one exemplary embodiment, the carrier and the first expandable adhesive together have a thickness of at least 3 mm or at least 4 mm or at least 5 mm or at least 10 mm on a total base area of the device.

This in turn has the advantage that a compact form of the device is suited more robust, more easily stackable and transportable and better suited for the foaming of main regions of the cavities.

In one exemplary embodiment, the first expandable adhesive forms a single cohesive element. In an alternative embodiment, a plurality of non-cohesive first expandable adhesives form a plurality of non-cohesive elements.

In one exemplary embodiment, the first expandable adhesive has an expansion rate of 1000 to 3000%. In one exemplary development, the first expandable adhesive has an expansion rate of between 1000 and 2700% or between 1500 and 2500%.

An exemplary material with such an expansion rate can be obtained under the trade name Sika Baffle® 455.

In an alternative embodiment, the first expandable adhesive has an expansion rate of 50 to 500%. In one exemplary development, the first expandable adhesive has an expansion rate of between 70 and 400% or between 100 and 300%.

An exemplary material with such an expansion rate can be obtained under the trade name Sika Reinforcer® 940.

In one exemplary embodiment, the carrier and the fastening element are configured in one piece.

In a further exemplary embodiment, the carrier and the fastening element are formed from the same material.

In one exemplary embodiment, the first adhesive is arranged on the carrier by an injection-molding process.

In one exemplary embodiment, the carrier is produced by an injection-molding process.

In one exemplary embodiment, the carrier and the first adhesive are produced by a two-component injection-molding process.

In one exemplary embodiment, the carrier comprises a plastic, in particular polyamide.

In one exemplary embodiment, the carrier comprises a fiber-reinforced plastic, in particular a glass fiber-reinforced or carbon fiber-reinforced plastic.

In principle, the carrier can be composed of various materials. Preferred materials are plastics, in particular polyurethanes, polyamides, polyesters and polyolefins, preferably polymers which can withstand high temperatures such as poly(phenylene ethers), polysulfones or polyether sulfones, which in particular are also foamed; metals, in particular aluminum and steel; or grown organic materials, in particular wood materials or other (densified) fibrous materials, or glass-type or ceramic materials; especially also foamed materials of this type; or any desired combinations of these materials. Polyamide, in particular polyamide 6, polyamide 6.6, polyamide 11, polyamide 12, or a mixture thereof, is particularly preferably used. Combinations with fibers, such as, for example, glass fibers or carbon fibers, are also possible.

Furthermore, the carrier can have any desired construction and any desired structure. It may be solid, hollow, or foamed, or have a grid-like structure, for example. Typically, the surface of the carrier may be smooth, rough or structured.

In one exemplary embodiment, the second expandable adhesive has an expansion rate of at least 200% or of at least 300% or of at least 400% or of at least 500% or of at least 800%.

An expandable and pumpable adhesive of this kind is described, by way of example, in European patent application EP 3 281 970 A1.

An example of an expandable, pumpable adhesive of this kind is an adhesive obtainable under the trade name Sikaseal®.

An example of a second expandable adhesive, which can be extruded, can be obtained under the name SikaBaffle® 455.

In one exemplary embodiment, the second expandable adhesive is arranged in the form of a bead or a plurality of beads on the second constituent part of the structural element.

In one exemplary embodiment, the second expandable adhesive is arranged on the second constituent part of the structural element by way of a robot.

In one exemplary embodiment, the at least one bead has a diameter of 2 to 20 mm or of 4 to 18 mm or of 6 to 16 mm.

In one exemplary embodiment, the at least one bead has a length of at least 10 mm or of at least 20 mm or of at least 30 mm or of at least 50 mm or of at least 100 mm.

In one exemplary embodiment, the second expandable adhesive contacts the structural element at the first joining point and at the second joining point.

In one exemplary embodiment, in the region of the first and the second joining point, the second expandable adhesive in each case touches both the first constituent part of the structural element and the second constituent part of the structural element.

In one exemplary embodiment, the second expandable adhesive has, in each case proceeding from the joining points, an extent along the second constituent part of the structural element of at least 10 mm or of at least 15 mm or of at least 20 mm or of at least 30 mm or of at least 40 mm.

In one exemplary embodiment, the second expandable adhesive forms a continuous element between the first joining point and the second joining point.

In one exemplary embodiment, the second expandable adhesive forms a single cohesive element. In an alternative embodiment, a plurality of non-cohesive second expandable adhesives form a plurality of non-cohesive elements.

In one exemplary embodiment, the second expandable adhesive is a pumpable or extrudable material.

In one exemplary embodiment, the second expandable adhesive can be pumped at a temperature of less than 80° C., preferably of less than 70° C., preferably of less than 60° C., particularly preferably of less than 50° C.

In one exemplary embodiment, the second expandable adhesive can be extruded at a temperature of less than 100° C., preferably of less than 90° C., preferably of less than 80° C., particularly preferably of less than 70° C.

In one exemplary embodiment, the second expandable adhesive can be pumped or extruded at a temperature which lies below an activation temperature of the second expandable adhesive by at least 20 K or by at least 30 K or by at least 40 K or by at least 50 K or by at least 60 K.

The object set in the introduction is additionally achieved by a method for insulating a structural element in a motor vehicle, the method comprising the steps of: providing a device having a carrier and a first expandable adhesive; arranging the device on a first constituent part of the structural element; arranging a second expandable adhesive on a second constituent part of the structural element; joining the first constituent part and the second constituent part of the structural element in order to form the structural element, wherein the device and the second expandable adhesive are arranged in a cavity between the constituent parts of the structural element; and expanding the first expandable adhesive and the second expandable adhesive, as a result of which a cross section of the structural element is substantially completely filled by the device and the second expandable adhesive.

In one exemplary embodiment, the method is carried out using a system according to the description above.

In one exemplary embodiment, the second expandable adhesive is arranged on the second constituent part of the structural element by way of a robot.

In one exemplary embodiment, the second expandable adhesive is pumped or extruded onto the second constituent part of the structural element.

In one exemplary embodiment, the second adhesive is arranged on the second constituent part of the structural element before or after the device has been arranged on the first constituent part of the structural element.

In one exemplary embodiment, during the expansion operation, a temperature of at least 100° C. or at least 120° C. or at least 140° C. is applied for the activation of the adhesives.

In one exemplary embodiment, heat is employed during the activation of the first expandable adhesive and of the second expandable adhesive, in particular the adhesives are activated in a finishing oven.

Details and advantages of the invention will be described below on the basis of exemplary embodiments and with reference to schematic drawings, in which.

FIGS. 3a to 3f illustrate various exemplary embodiments of devices 16. In these exemplary embodiments, the device 16 has a carrier 11 in addition to the first expandable material 13.1 in each case. In this case, the device 16 or the first expandable adhesive 13.1 is illustrated in each case in a non-expanded state.

In these exemplary embodiments, the device 16 in each case has a compact form and is of substantially cuboidal configuration.

To arrange the device 16 on a structural element, the device 16 in each case has at least one fastening element 5. Said fastening element 5 can in this case be of different design, for example in the form of a clip, in the form of a welding tab, in the form of a magnetic element or in the form of an adhesive.

Figure 3A:
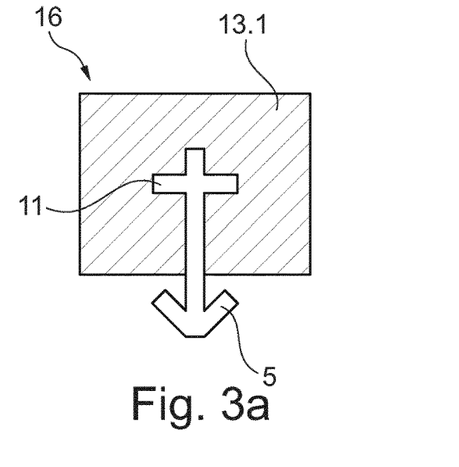
FIGS. 3a to 3f show schematic illustrations of exemplary devices.

In FIG. 3a, the carrier 11 is formed with a cross-like cross section which is anchored in the first expandable adhesive 13.1. The fastening element 5 in the form of a clip is formed integrally on said cross-like carrier 11.

Figure 3B:
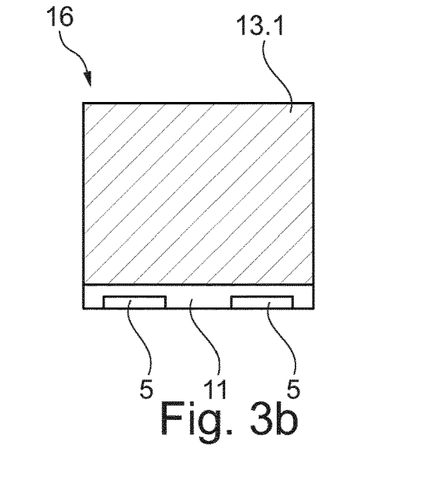

In FIG. 3b, the device 16 is likewise formed with a carrier 11 and a first expandable adhesive 13.1 arranged thereon. In this exemplary embodiment, the device 16 has two fastening elements 5 which are both integrated in the carrier 11 as magnetic materials.

Figure 3C:
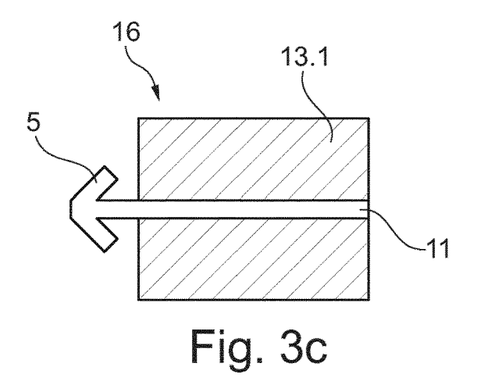

FIG. 3c illustrates a further exemplary embodiment of a device 16. In this exemplary embodiment, the carrier 11 is arranged in the center in the first expandable adhesive 13.1, and a fastening element 5 is formed integrally in the form of a clip on the carrier 11.

Figure 3D:
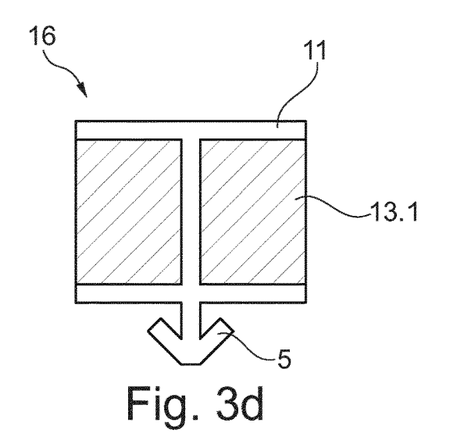

A further exemplary device 16 is illustrated in FIG. 3d. In this exemplary embodiment, the carrier 11 has a first plate and a second plate. The first expandable adhesive 13.1 is in this case arranged between said plates of the carrier 11. Furthermore, the fastening element 5, again in the form of a clip, is formed integrally on the carrier 11.

Figure 3E:
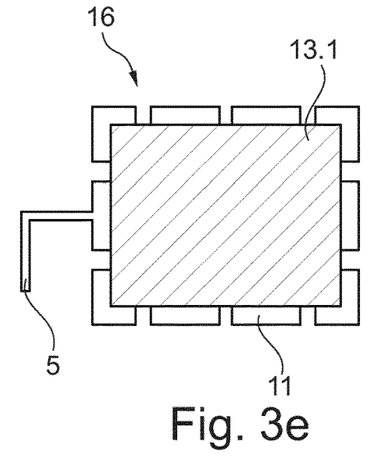

A further exemplary device 16 is illustrated in FIG. 3e. In this exemplary embodiment, the first expandable adhesive 13.1 is substantially enclosed by the carrier 11. In this case, the carrier 11 has openings, through which the first expandable adhesive 13.1 can expand during expansion. A fastening element 5 in the form of a welding tab is formed integrally on the carrier 11.

Figure 3F:
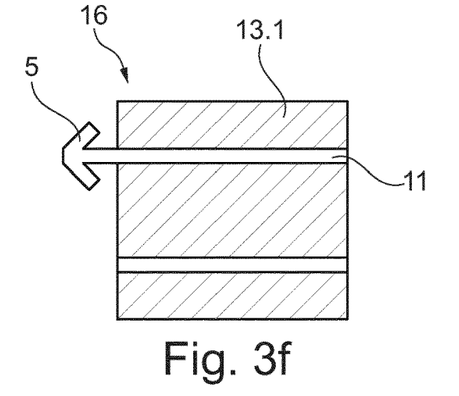

A further exemplary device 16 is illustrated in FIG. 3f. In this exemplary embodiment, the device 16 again has a first expandable adhesive 13.1 and a carrier 11. In this exemplary embodiment, the carrier 11 comprises a first plate and a second plate. In this case, the fastening element 5 in the form of a clip is formed integrally on the first plate.

Figure 4A:
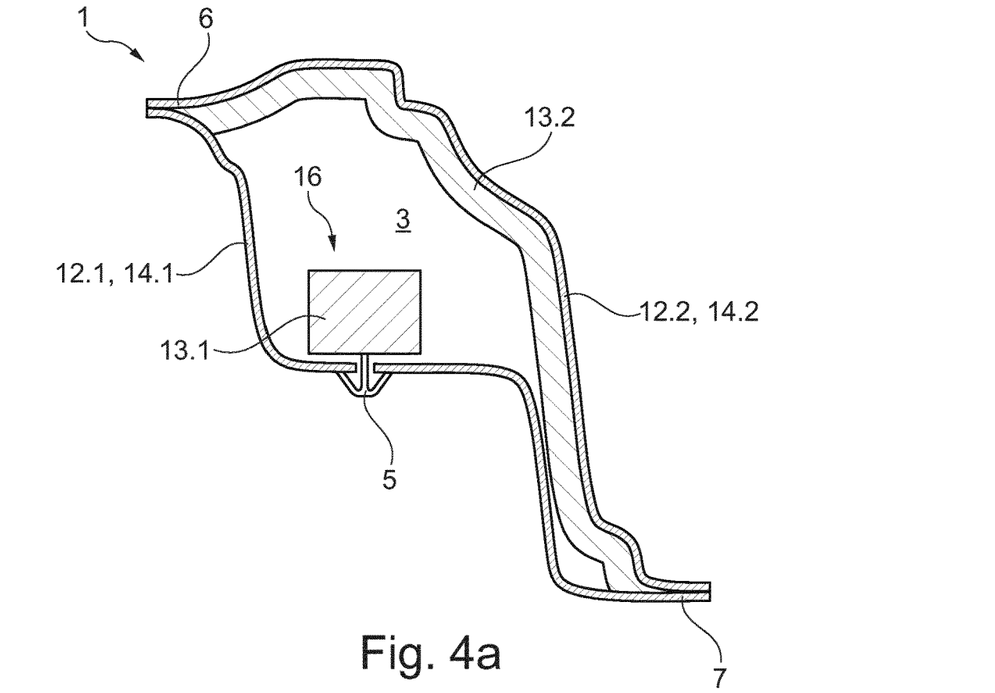
FIGS. 4a and 4b show schematic illustrations of an exemplary system for insulating a structural element.
Figure 4B:
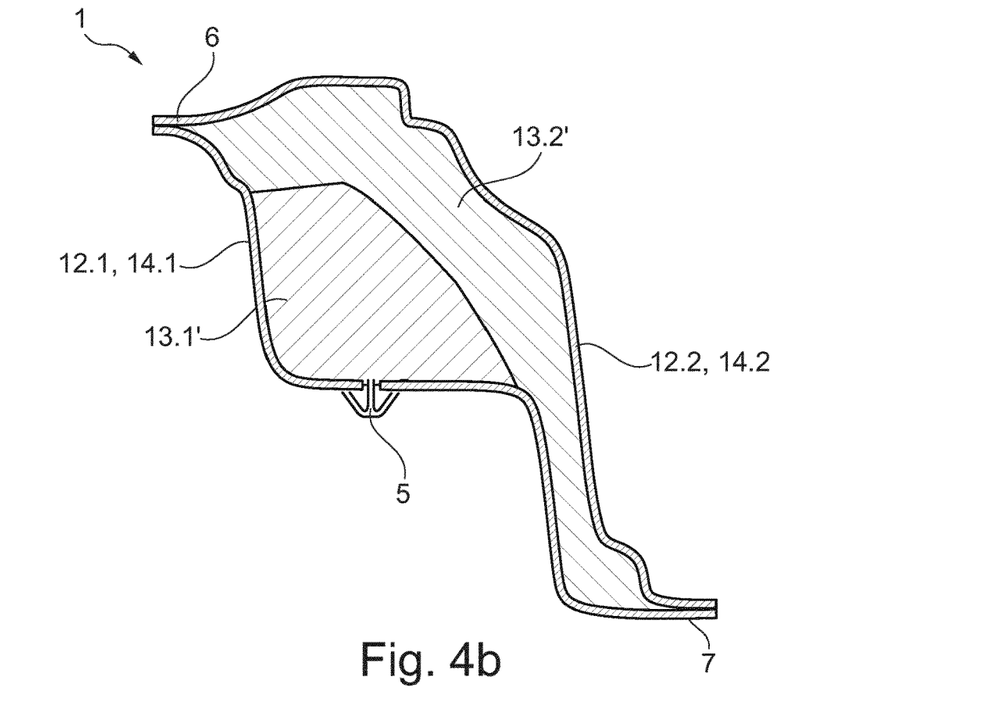

An exemplary and schematically illustrated embodiment of a system 1 for insulating a structural element 12, 14 is depicted in FIGS. 4a and 4b. In this case, the first expandable adhesive 13.1 and the second expandable adhesive 13.2 are in a non-expanded state in FIG. 4a, and in an expanded state in FIG. 4b.

The system 1 comprises a structural element 12, 14 having a first constituent part 12.1, 14.1 and a second constituent part 12.2, 14.2. The constituent parts 12.1, 14.1, 12.2, 14.2 of the structural element 12, 14 are in this case joined together at a first joining point 6 and at a second joining point 7, as a result of which a cavity 3 is formed.

In this exemplary embodiment, it can be seen that the device 16 is arranged in the cavity 3 of the structural element 12, 14 in such a way that the first expandable adhesive 13.1 can fill a main region of the cavity 3. In this case, the second expandable adhesive 13.2 is arranged on the second constituent part 12.2, 14.2 of the structural element 12, 14 in such a way that in particular the regions of the joining points 6, 7 can be substantially completely filled.

It can also be seen in FIG. 4*a* that the second expandable adhesive 13.2, in a non-expanded state, contacts the structural element 12, 14 in the region of the joining points 6, 7. This serves in particular to make it possible to substantially completely fill those regions of the joining points 6, 7 which are difficult to access.

In this exemplary embodiment, the second expandable adhesive 13.2 is also in particular used to substantially completely fill a difficult-to-access region of the cavity 3, said region extending toward the second joining point 7.

Figure 5:
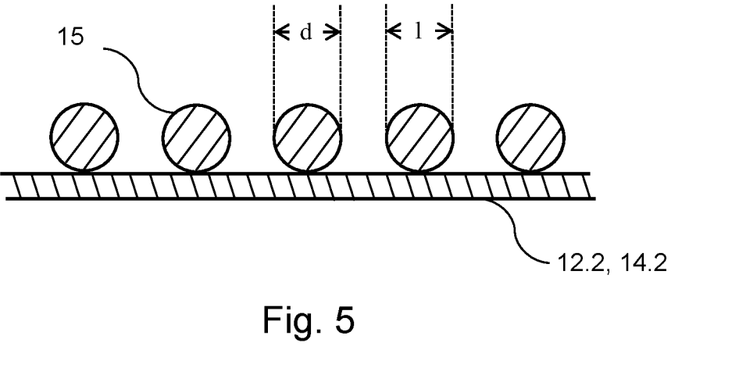
FIG. 5 shows a schematic illustration of a bead according to an embodiment.

The second expandable adhesive 13.2 may be arranged in the form of a bead 15 or a plurality of beads on the second constituent part 12.2, 14.2 of the structural element 12, 14, as seen in FIG. 5.

The at least one bead 15 may have a diameter (d) of 2 to 20 mm or of 4 to 18 mm or of 6 to 16 mm.

The at least one bead 15 may have a length (1) of at least 10 mm or of at least 20 mm or of at least 30 mm or of at least 50 mm or of at least 100 mm.

LIST OF REFERENCE DESIGNATIONS

1 System
3 Cavity
5 Fastening element
6 First joining point
7 Second joining point
10 Vehicle body
11 Carrier
12 Structural element
12.1 First constituent part
12.2 Second constituent part
13 Adhesive
13.1 First expandable adhesive
13.2 Second expandable adhesive
14 Structural element
14.1 First constituent part
14.2 Second constituent part
16 Device
21 Edge region

The invention claimed is:

1. A system for insulating a structural element in a motor vehicle, the system comprising:
a structural element having a first constituent part and a second constituent part, the constituent parts being joined together at a first joining point and at a second joining point, and the structural element forming a cavity;
a device having a carrier and a first expandable adhesive, the carrier being arranged on the first constituent part of the structural element by way of a fastening element; and
a second expandable adhesive which is arranged on the second constituent part of the structural element,
wherein the first expandable adhesive and the second expandable adhesive are in a non-expanded state and are configured, and arranged, in such a way that, after the adhesives have been expanded, the device and the second adhesive substantially completely fill a cross section of the structural element.

2. The system as claimed in claim 1, wherein the device has at least one of (i) a stackable form, and (ii) substantially a form of a cuboid, cylinder, truncated cone, cone, or cone of revolution.

3. The system as claimed in claim 1, wherein the carrier and the first expandable adhesive together have a thickness of at least 3 mm on a total base area of the device.

4. The system as claimed in claim 1, wherein the first expandable adhesive has an expansion rate of between 1000% and 3000%.

5. The system as claimed in claim 1, wherein the device is produced by an injection-molding process.

6. The system as claimed in claim 1, wherein the second expandable adhesive is a pumpable or extrudable material.

7. The system as claimed in claim 1, wherein the second expandable adhesive has an expansion rate of at least 200%.

8. The system as claimed in claim 1, wherein the second expandable adhesive is arranged in the form of a bead or a plurality of beads on the second constituent part.

9. The system as claimed in claim 8, wherein the at least one bead has a diameter of 2 to 20 mm and/or wherein the at least one bead has a length of at least 10 mm.

10. The system as claimed in claim 1, wherein the second expandable adhesive contacts the structural element at the first joining point and at the second joining point.

11. The system as claimed in claim 1, wherein the second expandable adhesive has, in each case proceeding from the joining points, an extent along the second constituent part of the structural element of at least 10 mm.

12. The system as claimed in claim 1, wherein the second expandable adhesive forms a continuous element between the joining points.

13. A method for insulating a structural element in a motor vehicle, the method comprising the steps of:
providing a device having a carrier and a first expandable adhesive;
arranging the device on a first constituent part of the structural element;
arranging a second expandable adhesive on a second constituent part of the structural element;
joining the first constituent part and the second constituent part the structural element in order to form the structural element, wherein the device and the second expandable adhesive are arranged in a cavity between the constituent parts of the structural element; and
expanding the first expandable adhesive and the second expandable adhesive, as a result of which a cross section of the structural element is substantially completely filled by the device and the second expandable adhesive.

14. The method as claimed in claim 13, wherein the second expandable adhesive is pumped or extruded onto the second constituent part of the structural element.

15. The method as claimed in claim 13, wherein the method is carried out using a system comprising:
the structural element having the first constituent part and the second constituent part, the constituent parts being joined together at a first joining point and at a second joining point, and the structural element forming the cavity;
the device having the carrier and the first expandable adhesive, the carrier being arranged on the first constituent part of the structural element by way of a fastening element; and the second expandable adhesive which is arranged on the second constituent part of the structural element,
wherein the first expandable adhesive and the second expandable adhesive are in a non-expanded state and are configured, and arranged, in such a way that, after the adhesives have been expanded, the device and the second adhesive substantially completely fill the cross section of the structural element.

\* \* \* \* \*